Patented Dec. 12, 1950

2,533,314

UNITED STATES PATENT OFFICE 2,533,314

POLYVINYL PARTIAL ACETAL COMPOSITION AND METHOD OF MAKING THE SAME

Frazier Groff, Plainfield, N. J., assignor, by mesne assignments, to Union Carbide and Carbon Corporation, a corporation of New York No Drawing. Application February 27, 1947, Serila No. 731,416

4 Claims. (Cl. 260—23)

Film-forming compositions containing drying oils, for such products as paints, varnishes, inks, and linoleum, may be made tougher and more resistant to wear, light oxidation, and liquids, by the incorporation of various synthetic resins. In recent years important advances have been made in the art of compounding these resin-oil compositions. Each kind of resin imparts distinctive and frequently useful characteristics, to the extent that it is soluble in and compatible with the common drying oils such as linseed and tung and with the various usual modifying substances such as rosin, lac, ester gum, soya-bean oil, or oiticica oil.

Not all synthetic resinous materials are compatible with these drying oils and modifiers. To take advantage of desirable properties of the incompatible resins, the problem is to "solubilize" them. Such a problem exists in the instance of polyvinyl partial acetal resins of the kinds described in H. F. Robertson Patents 2,162,678, 2,162,679 and 2,162,680, resulting from the condensation of polyvinyl alcohol with enough aldehyde to combine with a large part, but not all, of the alcohol (hydroxy) groups. Preferred resins are those acetalized between 54% and 78% with butyraldehyde, or between 62% and 88% with propionaldehyde, or between 39% and 58% with valeraldehyde. These resins are remarkably tough, clear, stable and strong, indicating that they would very materially improve film-forming oil compositions if they could be incorporated therein. Such resins are furthermore characterized by their water insolubility, but, unlike the polyvinyl ester, polyvinyl acetal and polyvinyl acetal-ester resins previously known, they are also, in general, not soluble in water-insoluble organic solvents at ordinary temperatures.

The principal objects of this invention are to provide novel materials derived from these polyvinyl partial acetal resins which are soluble in fatty drying oils such as linseed and tung oil and compatible with the usual modifying agents for film-forming oil compositions, and which will improve the said compositions; and, further, to provide a novel method for solubilizing these polyvinyl partial acetal resins with respect to the drying oils.

The objects of this invention are achieved by heating a polyvinyl partial acetal resin as thus described with a water insoluble monocarboxylic acid having at least 10 carbon atoms to the molecule, and preferably in the presence of drying oil such as linseed or tung, until a reaction product is obtained which is soluble in fatty drying oils and compatible with the usual ingredients of film-forming oil compositions.

I prefer to use a polyvinyl partial butyral resin of the kind described and claimed in Robertson Patent 2,162,678.

The monocarboxylic acid which I prefer is rosin (colophony) but other water insoluble monocarboxylic acids may be used, for instance capric, undecylenic, lauric, tridecylic, myristic, pentadecylic, palmitic, lineleic, linolenic acid, oleic, stearic, ricinoleic and abietic acids. Mixtures of fatty acids particularly those obtained by subjecting fatty oils to the Twitchell process can also be used. The minimum proportion of acid to resin will depend to some extent upon the particular resin to be solubilized and the maximum proportion upon the properties desired in the final film; preferably however, enough acid is provided to theoretically esterify substantially all the free hydroxyl groups of the resin, as thereby reaction products are obtained free from haze or cloudiness at room temperatures and which furthermore when heated dissolve in fatty drying oils to yield solutions that are clear both at the dissolving temperature and on cooling to room temperature. Reaction products prepared with lesser amounts of acid tend to be slightly hazy or cloudy and also to yield solutions in drying oils of similar haziness. On the other hand an excess of acid above that theoretically required to esterify all the hydroxyl groups of the polyvinyl partial acetal resin is of value when the reaction product is cooked with fatty drying oils having conjugated double bonds because the presence of excess acids in the resin desirably retards the gelation of the oil enabling gas-proof varnishes to be produced with minimum danger of gelation. The proportions of resin, acid and oil are otherwise not critical and the best for a desired result can readily be determined by trial as is customary in this art.

The method of the invention may be carried on conveniently in the equipment commonly used for cooking or boiling varnishes. The resin and acid are heated at a high temperature, preferably 200° to 300° C. until a homogeneous oil-soluble material is obtained. The oil may be added to the raw mixture of resin and acid, or at any later stage. The solution may then be compounded with other materials, such as pigments, fillers, driers, gums, lac, thinners, etc., in the customary manner to produce the desired film-forming composition.

When desired, the resin and acid may be reacted in the absence of drying oil, and cooled, and at some later time dissolved in the drying oil. In such a case, the resin-acid reaction is most conveniently carried out in a liquid diluent, such as a high boiling hydrocarbon, which may later be removed by distillation.

*Example 1.*—In a typical example of the practice of the invention, 100 parts by weight of rosin (WG grade) and 5 parts of polyvinyl partial butyral resin (about 66% acetalized) were heated together at 200° to 250° C. for about an hour. A clear resinous product was obtained, clear both hot and cold. To 100 parts by weight of this product, 100 parts of China-wood (tung) oil were added, and the mixture was heated for several hours at 200° to 260° C. The end product was a clear resinous mass much less friable than the original rosin reactant.

*Example 2.*—In another example, 100 parts of rosin (WG) and 10 parts of the same polyvinyl partial butyral resin were heated at 210°–260° C. until the mixture was clear when hot and practically clear when cold. To this mixture 100 parts of tung oil was added and the heating was continued. After a few minutes the mixture was clear when hot or cold, the cold product being a clear viscous liquid. Further heating for about 20 minutes yielded a product which was almost a gel at room temperature, and still further heating produced a progressively harder gumlike material.

*Example 3.*—In still another example, 100 parts by weight of rosin (WG), 10 parts of the polyinvyl partial butyral resin, and 100 parts of linseed oil were heated together at 250°–270° C. Water was eliminated, as indicated by the frothing of the mixture. After about 50 minutes of heating, the product was a viscous liquid, clear both hot and cold, and miscible with linseed and tung oils. A printing ink may comprise 10 parts of this product, 10 parts boiled linseed oil, 10 parts lampblack, modifiers and thinners in small amounts.

*Example 4.*—A clear, soft, sticky gel was made by heating 75 parts by weight of the polyvinyl partial butyral resin, 100 parts of rosin (WG), and 180 parts of linseed oil at 240° to 275° C. for 45 minutes. In this example, the proportions of rosin and resin were approximately those theoretically required to esterify all of the remaining hydroxyl groups of the resin. The sticky gel was soluble cold in toluene, ethylene dichloride, hexone, dioxane; only partly soluble in hot isopropanol, and insoluble in cold or hot acetone and petroleum ether.

Examples of the use of monocarboxylic acids other than rosin follow.

*Example 5.*—A clear viscous balsam was prepared by heating 25 parts by weight of the polyvinyl partial butyral resin, 35 parts of abietic acid, and 60 parts of linseed oil, at 250° to 290° C. for about an hour. The product was soluble cold in toluene, ethylene dichloride, methyl isobutyl ketone, dioxane; only partly soluble in hot isopropanol; apparently soluble in hot acetone, but precipitated out on cooling, and insoluble in cold or hot petroleum ether.

*Example 6.*—A clear, viscous balsam was prepared by heating 50 parts by weight of the polyvinyl partial butyral resin, 64 parts of oleic acid, and 120 parts of linseed oil, at 250° to 290° C. for about an hour. The product yielded a clear, viscous liquid when mixed and heated with an equal quantity of linseed oil. The product was also soluble in cold toluene, ethylene dichloride, methyl isobutyl ketone but insoluble in hot or cold acetone or petroleum ether.

*Example 7.*—A clear balsam was obtained by heating, at about 260° C. for about an hour, 25 parts by weight of the polyvinyl partial butyral resin, 32 parts of stearic acid, and 60 parts of linseed oil.

*Example 8.*—A mixture consisting of 21 parts by weight of the polyvinyl partial butyral resin, 10 parts of undecylenic acid and 50 parts of linseed oil were heated to 250° C.–290° C. After 10 minutes heating a soft resin layer was present in the oil. Within a few minutes thereafter stirring dispersed the resin uniformly into the oil forming a viscous liquid which was slightly cloudy when hot and a tough hazy gel when cold. Prolonging the heating of the resin for an additional 10 minutes produced a somewhat softer gel when cold but which was still slightly hazy. An additional 8.5 parts of undecylenic acid were added to the hot resin and the heating continued; four minutes after this addition the mixture was clear when hot and an almost clear soft gel when cold. Further heating for 40 minutes after adding 50 parts of linseed oil produced a clear viscous liquid which when cold formed a clear and rubbery elastic mass.

*Example 9.*—A clear, viscous liquid was obtained by heating 21 parts by weight of the polyvinyl partial butyral resin with 26 parts of ricinoleic acid and 50 parts of linseed oil, at 250° to 290° C. for about 30 minutes.

The products obtained in the foregoing examples may be used for the manufacture of items such as paints, varnishes, inks, and linoleum. When necessary, or desirable, oil, thinner, pigment, drier, modifiers, etc. may be compounded with the liquid, balsam, gel, or solid solubilized-resin products.

*Example 10.*—A suitable varnish can comprise, in parts by weight: rosin 100 parts, polyvinyl partial butyral resin (66% acetalized) 75 parts and linseed oil 180 parts, which are heated together with stirring to 240° C.–275° C. for about 45 minutes to form a clear, soft, sticky gel. A varnish was prepared by dissolving this reaction product in enough toluene to form a pourable solution. A strip of cotton cloth was dipped in this solution and then removed to drain and dry overnight at room temperature. It was then baked in an oven for 8 hours at 100° C.; the baked coated cloth was non-tacky and flexible. A paint was made from the reaction product by heating together until disolved 41.4 parts of the resin gel and 82.4 parts of raw linseed oil; addition of a small quantity of white lead greatly accelerated the drying rate of the paint.

*Example 11.*—Another typical varnish formulation comprises heating 50 parts of rosin with 37.5 parts of polyvinyl partial butyral at 260° until the reaction product is clear when cold. Then add 25 parts China-wood oil and heat at 270° C. for about one-half hour, to produce a clear, viscous liquid when hot and a relatively tough, clear, gum-like product when cold. The gum was dissolved in enough toluene to yield a clear pourable solution, which when coated on wood, air-dried to a very slightly tacky surface in three hours and after standing overnight was non-tacky.

I am aware that it has been proposed to acetalize with butyraldehyde a mixed polymerization product of vinyl acetate and a small proportion of vinyl ester of oleic acid, and to dissolve the resulting product in the usual solvents for lacquers. The result of such method is merely to modify to a degree the properties of the butyraldehyde acetal without, as far as it is known, producing a product soluble in drying oils.

It is also known that the polyvinyl partial acetal resins are soluble in some nondrying oils, such as castor oil. Such a solution, however, is of limited utility and is not adapted for use in conventional air-drying paint and varnish manufacturing procedures.

In contrast to these prior proposals, the present invention provides the art with a method and a product which are readily adapted to the procedures with which manufacturers have long been familiar.

This application is a continuation in part of my copending application Serial No. 508,983 filed November 4, 1943 and which has since been abandoned.

I claim:

1. A resinous composition of matter comprising a polyvinyl partial acetal resin of the group consisting of polyvinyl alcohol acetalized between 54% and 78% with butyraldehyde, of polyvinyl alcohol acetalized between 62% and 88% with propionaldehyde and polyvinyl alcohol acetalized between 39% and 58% with valeraldehyde, said resin having been heated to a temperature between 200° C. and 300° C. in admixture with a fatty drying oil and a water-insoluble monocarboxylic acid having between 10 and 20 carbon atoms to the molecule selected from the group consisting of rosin and the fatty acids until a reaction product is obtained characterized by solubility in fatty drying oils, the proportion of acid to acetal resin being substantially that required to esterify the free hydroxyl groups of the acetal resin.

2. A resinous composition of matter comprising a polyvinyl partial butyral resin acetalized between 54% and 78% said resin having been heated to a temperature between 200° C. and 300° C. in admixture with a fatty drying oil and rosin substantially in amount to theoretically esterify all the free hydroxyl groups of the butyral resin, until the mixture is clear and homogeneous at room temperature and is soluble in fatty drying oils.

3. The process which comprises heating to a temperature between 200° C. and 300° C. a polyvinyl partial acetal resin of the group consisting of polyvinyl alcohol acetalized between 54% and 78% with butyraldehyde, of polyvinyl alcohol acetalized between 62% and 88% with propionaldehyde and polyvinyl alcohol acetalized between 39% and 58% with valeraldehyde in admixture with a fatty drying oil and a water-insoluble monocarboxylic acid having between 10 and 20 carbon atoms to the molecule, selected from the group consisting of rosin and fatty acids, the proportion of acid to acetal resin being substantially that required to esterify all the hydroxyl groups of the partial acetal resin, said mixture being held within the aforementioned temperature range until a sample on cooling to room temperature remains clear and homogeneous and then cooling the mixture.

4. The process which comprises heating at 200° to 300° C. a mixture comprising linseed oil, rosin, and polyvinyl partial butyral resin acetalized between 54% and 78%, the amount of rosin being substantially that required to theoretically esterify all the free hydroxyl groups of the butyral resin, and continuing the heating until a sample on cooling to room temperature remains clear and homogeneous, and then cooling the mixture.

FRAZIER GROFF.

REFERENCES CITED

The following references are of record in the file of this patent:

UNITED STATES PATENTS

| Number | Name | Date |
| --- | --- | --- |
| 2,348,756 | Ryan | May 16, 1944 |
| 2,371,065 | Powers | Mar. 6, 1945 |
| 2,387,831 | Cogan et al. | Oct. 30, 1945 |
| 2,402,910 | Novak et al. | June 25, 1946 |
| 2,416,433 | Brown | Feb. 25, 1947 |
| 2,422,259 | Pratt | June 17, 1947 |

FOREIGN PATENTS

| Number | Country | Date |
| --- | --- | --- |
| 477,885 | Great Britain | Jan. 7, 1938 |
| 512,478 | Great Britain | Sept. 18, 1939 |